John M. Tiernan's
Tongue Supporter for Street Cars
PATENTED
DEC 17 1867
72430
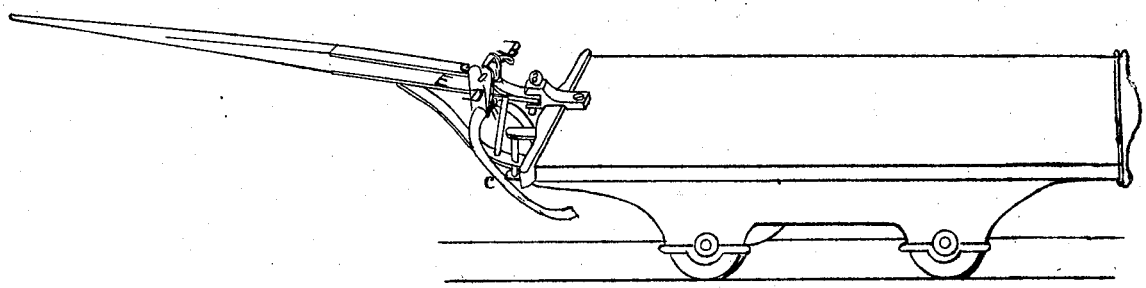
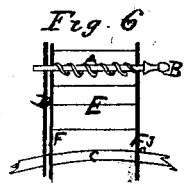
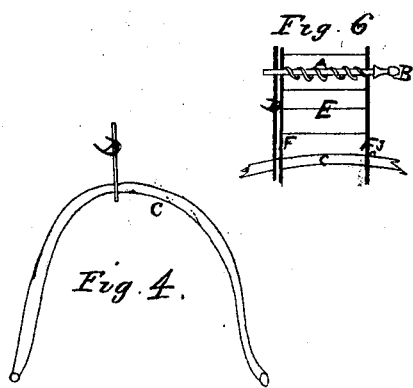
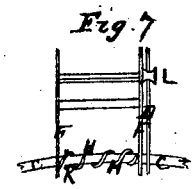
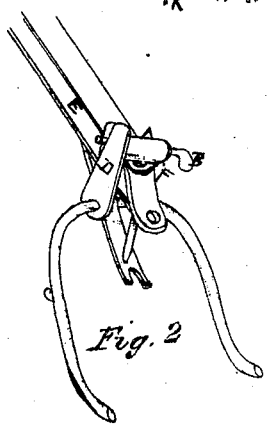
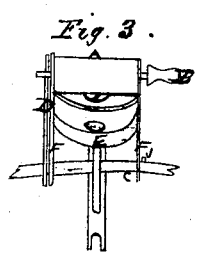
Witnesses —
Malcolm McNay
Chas. A. Miller
Inventor,
John M. Tiernan

United States Patent Office.

JOHN M. TIERNAN, OF PITTSBURG, PENNSYLVANIA.

Letters Patent No. 72,430, dated December 17, 1867.

---

IMPROVED TONGUE-SUPPORT FOR RAILROAD STREET-CARS.

---

The Schedule referred to in these Letters Patent and making part of the same.

---

Be it known that I, JOHN M. TIERNAN, of Pittsburg, in the county of Allegheny, and Commonwealth of Pennsylvania, have invented a new and useful Machine for Supporting the Tongues of Street-Cars and other Vehicles or Machines; and I do hereby declare that the following is a full, clear, and exact description of the construction and operation of the same, reference being had to the accompanying drawings, making a part of this specification, in which—

Figure 1 is a perspective view of the machine, as it appears when the curved bar C is elevated, attached to the tongue of a street-car in motion.

Figure 2 is a perspective view of the machine, as it appears attached to a tongue separated from a car, with the curved bar C depressed.

Figure 3 is a rear perspective view, showing only a part of the curved bar C and the rear of the tongue.

Figure 4 is a rear plane view of the curved bar C and lever D.

Figure 5 is a side plane view of the curved bar C and lever D.

Figures 6 and 7 are transverse sectional views; and

Figure 8 is a view of the spring-bolt, uncovered.

In the drawings, A represents merely the covering-cylinder of the spring-bolt B. B is the spring-bolt. C is the curved or bent metallic bar or rod. D is the lever, fastened to the curved or bent bar. E is the tongue of a car or vehicle. F are the bearings, which support the curved bar. H is the spiral spring, encircling the curved bar, in fig. 7. J is a pin or screw, in figs. 3 and 6. K is a pin or screw, in fig. 7; and L is a short bar or bolt, in fig. 7.

I construct my machine by taking a bar or rod of iron, or other metal, of a suitable length, and of a proper diameter or thickness, say one inch, and bend the same into the shape and curve shown in the drawings, as letter C, and firmly fasten thereto, in such place on said bar as that when in position it will come close up to the tongue E, a flat metal bar or lever, D, sufficiently long to strike against the spring-bolt B, and then pass the said curved bar C through the bearings F F, which have been first firmly fastened to the tongue E, preventing the said curved bar from moving or being jerked out of the said bearings by fastening a pin or screw, J, in the said bar, on the outside of but close to the bearings farthest from the lever D, using a spring-bolt, B, to keep the bar in the desired position.

By this mode of construction, the curved bar C is not intended to have any, or, if any, a very slight, lateral motion, but the spring-bolt B is drawn away from or thrown out in front of the lever D, so that the latter moves backwards or forwards, close to the tongue E.

I also construct my machine in a manner similar to that before described, omitting the spring-bolt B, and the pin or screw J, but using a spiral spring, H, around the curved bar C, under the tongue E, preventing the said bar from coming out of the bearings by putting a pin or screw in said bar at K, and fastening a short bar or bolt of iron, L, projecting a little beyond the tongue, on the top of the tongue, against which to rest the lever D. This as shown in fig. 7. By this construction the curved bar C has a lateral motion sufficient to permit the lever D to escape the bar or bolt L, against which it is thrown.

The principle of the operation after either mode of construction, is the elevation or depression of the curved bar C by means of a lever, D, attached to the said bar, and resting against a bolt above, whether the latter be a spring-bolt, as B in fig. 6, or a bolt immovably fastened to the tongue, as L in fig. 7. I operate the machine, when the curved bar C is elevated, as in fig. 1, by drawing the spring-bolt B far enough back to escape the lever D, when the said bar will fall of its own weight, carrying the lever D back behind the bolt B, which is then permitted to fly out; and the tongue being detached from the car, its weight falling on the curved bar C, causes the lever D to be thrown forward against the said spring-bolt, and the curved bar is thus kept in a depressed position, with its ends resting on the ground, to carry the tongue.

When the tongue is again attached to the car, the curved bar C being depressed, as in fig. 2, the spring-bolt B is drawn back far enough to escape the lever D, and the curved bar being then lifted up, the said lever passes in front of the spring-bolt, which is then permitted to fly back, and the said lever, resting against its front, holds up the curved bar C, as in fig. 1.

*Claim.*

What I claim as my invention, and desire to secure by Letters Patent, is—

The mode of supporting the tongues of street-cars and other vehicles or machines while the same are being moved from place to place, or changed from one end of a car to the other, by the use of a curved or bent metallic bar or rod, attached to or swung under the tongue, together with the mode of operating the said bar by a lever fastened thereto acting against a bolt fixed to the tongue over the said bar, as the same is hereinabove described.

JOHN M. TIERNAN.

Witnesses:
MALCOLM HAY,
CHAS. A. MILLER.